United States Patent [19]  
Cavanagh et al.

[11] 3,955,020  
[45] May 4, 1976

[54] GLASS CONTAINER WITH PLASTIC WRAPPER

[75] Inventors: Joseph C. Cavanagh, Bay Shore, N.Y.; Michael D. Cromb, Shrewsbury; Emanuel E. Terner, Oakhurst, both of N.J.

[73] Assignee: Midland Glass Company, Inc., Cliffwood, N.J.

[22] Filed: June 20, 1973

[21] Appl. No.: 371,679

[52] U.S. Cl. ............................... 428/35; 215/12 R; 215/DIG. 6; 428/195; 428/203; 428/210; 428/515
[51] Int. Cl.² ........................................ B65D 11/16
[58] Field of Search .................... 215/DIG. 6, 12 R; 161/146, 194, 197, 203, 227, 231, 247, 251, 413; 428/35, 195, 203, 210, 515

[56] References Cited  
UNITED STATES PATENTS

| | | | |
|---|---|---|---|
| 3,110,554 | 11/1963 | Yazumi | 215/12 R UX |
| 3,481,804 | 12/1969 | Snyder | 161/252 X |
| 3,496,061 | 2/1970 | Freshour et al. | 161/252 X |
| 3,542,229 | 11/1970 | Beyerlein et al. | 215/12 R X |
| 3,604,584 | 9/1971 | Shenk | 215/DIG. 6 |
| 3,607,519 | 9/1971 | Beyer | 161/413 X |
| 3,698,586 | 9/1970 | Terner | 215/DIG. 6 |
| 3,748,115 | 3/1974 | Hofmann et al. | 161/252 |
| 3,760,968 | 9/1973 | Amberg | 215/12 R |
| 3,823,032 | 7/1974 | Ukai | 215/DIG. 6 X |

*Primary Examiner*—Marion E. McCamish  
*Attorney, Agent, or Firm*—Ryder, McAulay, Fields, Fisher & Goldstein

[57] ABSTRACT

A glass container, particularly a bottle, is wrapped in a plastic laminate which is held to the glass by an adhesive. The plastic laminate protects the surface of the bottle from abrasive forces which would diminish the strength of the glass, in combination with the adhesive substantially prevents scattering of the glass, should it be broken, and, because of its structure, provides for application of an attractive graphic design or label which is also protected from abrasion. The plastic laminate includes an inner laminate which is generally opaque, and an outer lamina which is transparent, the label or other graphic design being placed between the lamina.

30 Claims, 6 Drawing Figures

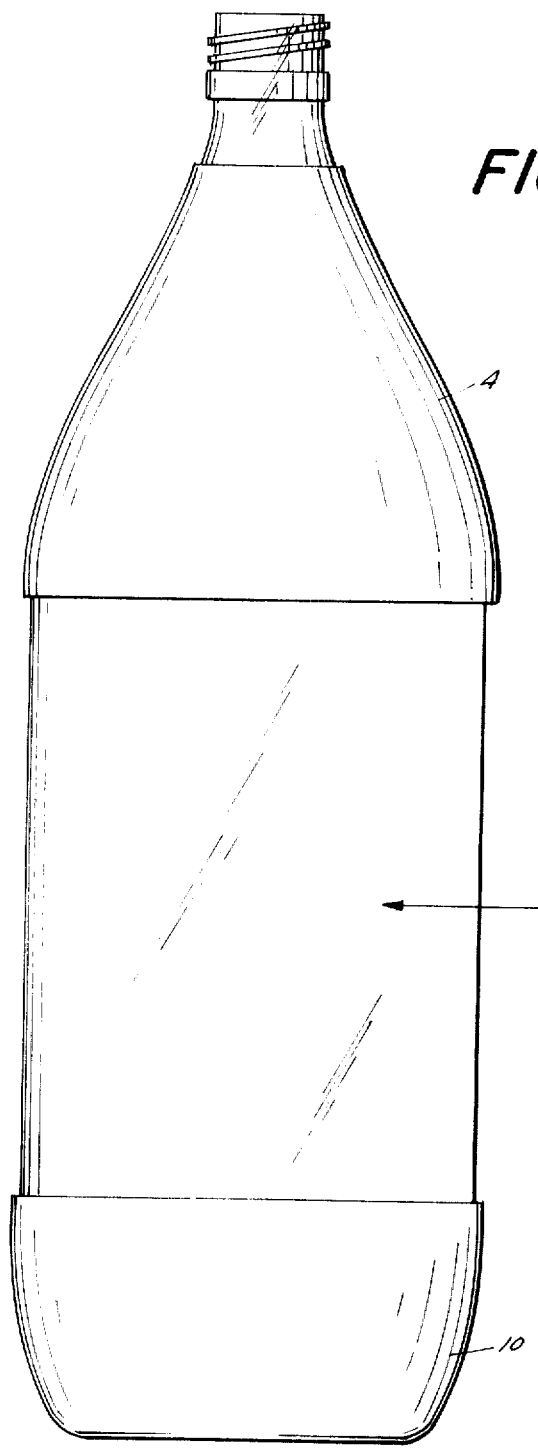
FIG. 4
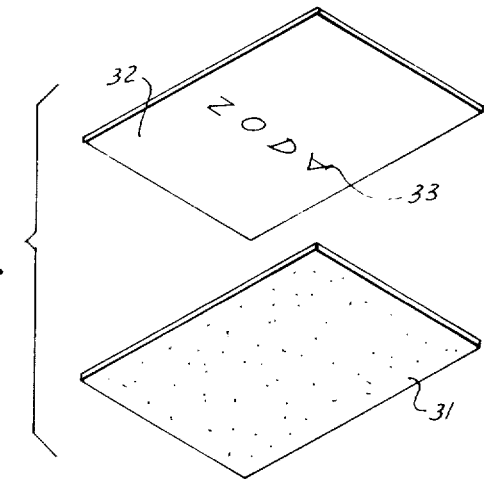
FIG. 5
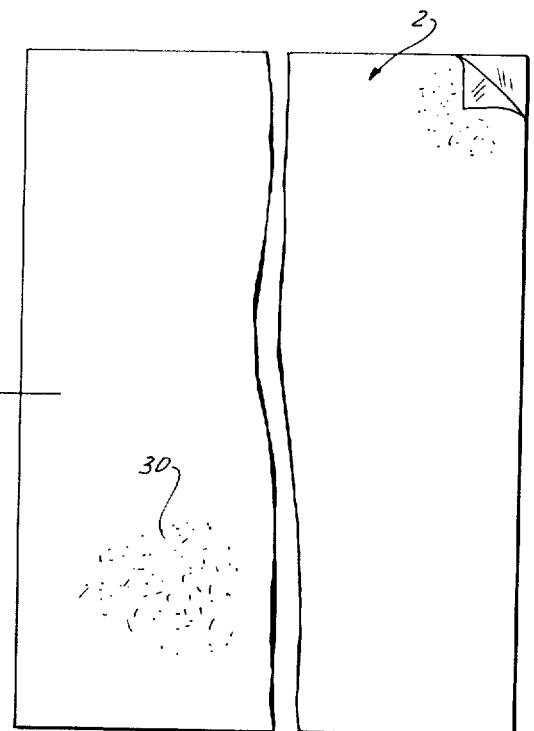

GLASS CONTAINER WITH PLASTIC WRAPPER

BACKGROUND OF THE INVENTION

Numerous systems for protection of the surfaces of glass containers, such as bottles, have been described in the prior art. Many of the systems so described are for abrasion protection, such as in Carl et al, U.S. Pat. No. 3,323,889, and Scholes et al, U.S. Pat. No. 3,420,693. These patents describe the application of thin layers of a metallic compound followed by equally thin layers of a lubricating material. While such treatments do provide some protection for abrasion of the bottle, should the bottle, notwithstanding, be subject to breakage, nothing prevents scattering of the glass. Further, these treatments generally protect the bottle from scratches which are occasioned by rubbing against adjacent bottles and under limited circumstances. Should an extreme force be applied in rubbing an adjacent bottle against a bottle coated according to the methods of these patents, scratching would nonetheless occur and the inherent strength of the glass would be weakened.

Other patents have described the coatings of glass containers, including bottles, with various plastic coatings to prevent breakage. For example, U.S. Pat. No. 3,007,594—Wallace, describes the encasement of glass carboys in a foamed plastic with a varying density in the foam, the lowest density being at the top of the carboy and the highest density at the bottom. In general, should the carboy break notwithstanding the protection afforded by the foamed coating, the pieces of the glass may be held within the coating. However, as is well known, it is extremely difficult if not impossible to decorate the surface of this type of plastic foam. The best method of applying a decoration is to apply a yet further label to the outside of the foamed surface. Thus, for an attractive decoration or label to be applied to a foam encased glass container, two entirely separate layers must be applied to the glass container, each serving a separate function. If a simple paper layer is applied as the label, while the glass is as protected as previously from abrasion or breakage, the label itself is easily abraded.

In U.S. Pat. No. 3,415,673—Clock, glass bottles are coated with an adhesive layer which is said to hold the bottle intact should it be broken. However, such an adhesive layer is not subject to decoration and as most bottles are employed in retail sales, decoration is an extremely important consideration. Thus, these bottles are not subject to practical commercial use.

SUMMARY OF THE INVENTION

In accordance with the present invention, a covering has been developed for at least the straight section of a glass container, such as a bottle, which provides not only the attractive decoration necessary for a commercial article, but also substantially prevents scattering of pieces of the glass container should it be broken. Further, the covering aids substantially in preventing breakage of the glass in the first instance due to its ability to withstand abrasion and to the cushioning and strength which it lends to the glass surface beneath it. Further, employing such a structure there will be a substantial reduction in noise level on use of the glass containers both by bottlers and by the consumer.

The covering includes at least two plastic film lamina with a graphic print between the two lamina. The plastic film lamina closest to the glass surface is chosen for cost, tensile strength and tear strength. Generally, it is opacified in order to render more attractive the graphic design which appears above it. For example, this lamina can be formed of polyethylene with thicknesses of from about three-quarters to five mils. The outer film lamina, that lamina furthest from the glass surface to which the covering is applied, is chosen for economy and clarity. Generally, as it is to protect only the graphic design beneath it, it is made as thin as possible, often from one-half to three mils. This lamina can be formed, for example, of polypropylene. This combination provides an enhancement of the effects of each lamina, much in the way that the various layers in a piece of plywood enhance the strength of the other layers.

Through the choice of the plastic lamina, the design can be applied by any desired standard method. Gravure and flexographic printing can be equally well employed and the design can be of a single color or multicolred, as desired. The ability to provide a multicolored design in a labeled covering of this type is particularly advantageous for commercial usage.

The covering is held to the glass container, particularly the surface of a bottle, by an adhesive, which may, itself, be a lamina of the overall laminate which is applied to the glass container. The method of application of the adhesive or the particular type of adhesive, i.e., heat activatable or pressure sensitive, is not important. It is generally important only that the label be firmly adhered to the bottle. Of less importance, but still significant, is the ability of the adhesive to bind the inner lamina of the laminate covering to the outer layer at a seam so as to prevent "flagging" of the covering.

The label has a degree of inherent lubricity, at least on the surface, and thus prevents abrasion of the surface of the glass beneath it. This, in combination with the inherent cushioning of the plastic layer, provides for a safer bottle, even in shipping. With plastic laminates as described herein, the bottles may be shipped far less expensively, as separators are not required, even for long distances. As the plastic laminate serves to protect the bottles from abrasion and aids in retaining fragments of glass, it also serves to function as a separator during shipping. The ability to ship without separators reduces the cost of shipping by reducing both the weight and volume required to ship a given number of containers, as well as eliminating the separators themselves.

The plastic laminate of the present invention is applied to the straight portion of the container. If desired, further protection may be provided to the heel and shoulder of the bottle. In general, this protection involves application of a plastic film to the heel or shoulder or, more desirably, to both the heel and shoulder. When a film is applied to either the heel or the shoulder, the adhesive which is employed to bond the plastic laminate to the glass surface must also be capable of adhering this label to the plastic film. The plastic film, when applied, should extend approximately one-half inch onto the straight portion of the glass bottle so that there is approximately a one-half inch overlap which includes both the plastic film and the plastic layer of the present invention.

The plastic film applied to the heel and shoulder portions of the glass bottle essentially take the shape of a cup on the heel of the bottle and a cone on the shoulder of the bottle as described and claimed in U.S. Pat. No. 3,698,586. This cup and cone may be preformed or may be applied to the heel and shoulder by any of a variety of techniques including fluid bed application, spraying, etc., with techniques for even application of the material. A preferred material for direct application to the heel or shoulder of the bottle is an ionomer, such as that sold under the trademark SURLYN.

The laminate which is applied can be translucent or can take any desired color, depending upon the additives applied to the various lamina. In fact, should it be desired, the laminate can assume one color and the films applied to the heel and shoulder can take different colors, either a single color or a plurality of colors, so as to provide a multicolored design, should that be desirable.

BRIEF DESCRIPTION OF THE DRAWINGS

In the accompanying drawings:

FIG. 4 shows application of a plastic layer to the straight section of a bottle to which a cup and cone have been applied;

FIG. 5 is an exploded view of the composite plastic laminate of the present invention.

DESCRIPTION OF THE PREFERRED EMBODIMENTS

Figures 1, 2:
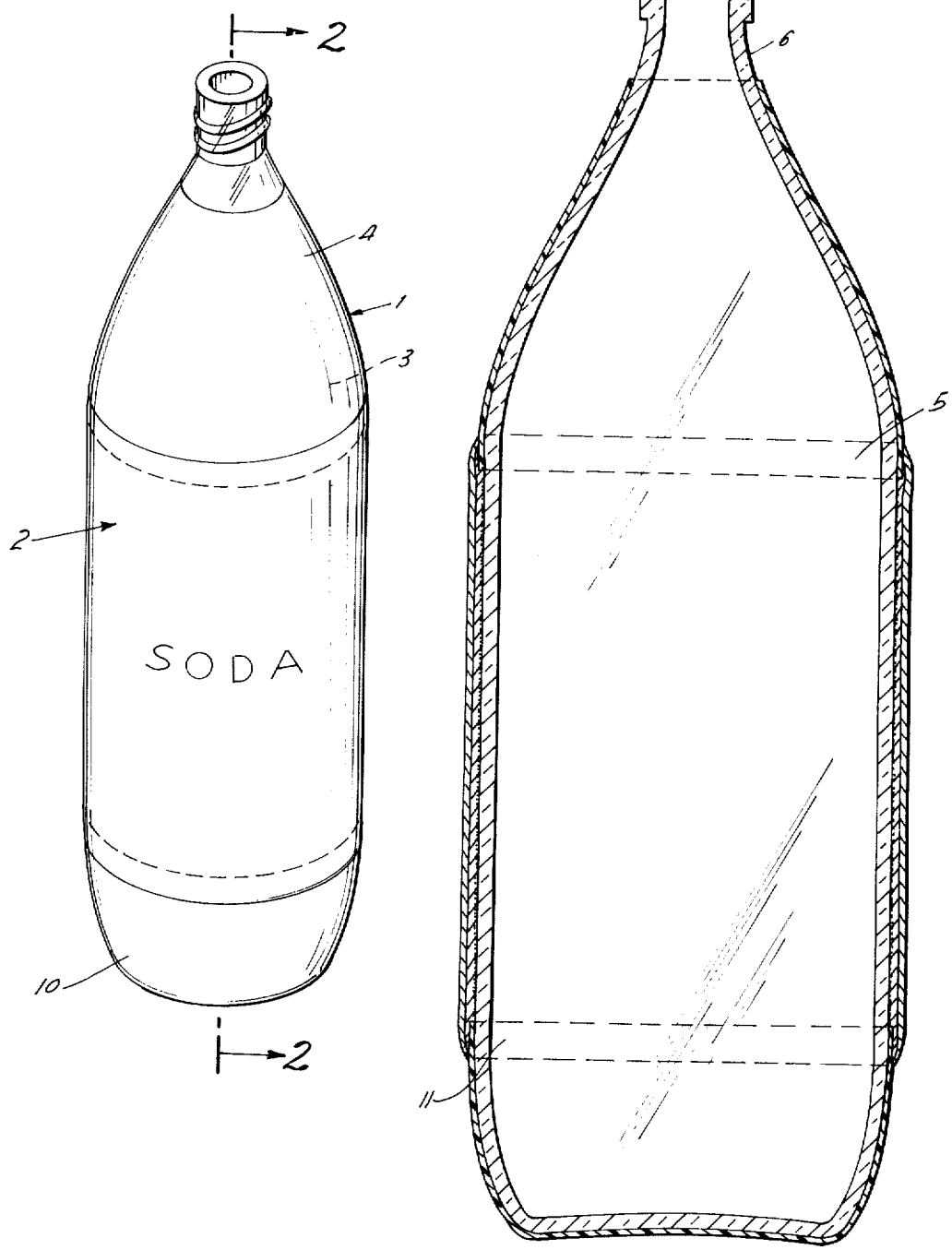
FIG. 1 is a perspective view of a bottle having a plastic layer applied according to the present invention.
FIG. 2 is a plan view, in section, along the line 2—2 of FIG. 1.

Referring to the accompanying drawings, a glass container in the form of a bottle 1 is illustrated in FIGS. 1 and 2 having a plastic laminate 2 applied to the central, straight portion of the bottle. As indicated, this laminate is applied only to the straight section. The shoulder of the bottle 3 is protected by a plastic cone 4 which is applied in such a manner as to cover approximately one-half inch of the straight section as illustrated by the area 5 in FIG. 2.

While the plastic film on the heel or shoulder of the glass bottle has been described, when present, as extending approximately one-half inch into the straight section of the bottle, it will be appreciated that the specific distance which the film extends is not critical. Thus, the film may extend more or less than one-half inch into this area.

By carrying the plastic film cone 4 into the straight section in the area 5, overlapping of the plastic laminate 2 with the film 4 is provided for. Thus, more complete protection of the glass bottle is provided than that protection provided by the plastic laminate alone.

In a manner similar to cone 4, a plastic film 10 in the form of a cup is placed over the heel of the bottle. The film 10 extends into the area 11 on the straight section of the bottle so that the cup 10 is overlapped by plastic laminate 2 to provide more complete protection of the glass bottle.

As previously indicated, it is not required in all situations that a film cone 4 or a film cup 10 be provided. The plastic laminate 2 may be used alone on the glass container to provide substantial protection to the glass bottle. When the film cone 4 and film cup 10 are employed, various methods of application can be used. For example, the cup and cone may be preformed and shrunk fit onto the bottle before application of plastic laminate 2. If desired, the film cone and cup can be applied by other coating methods such as by fluid bed coating, spraying, etc. A particularly desirable film for the cup 10 and cone 4 is prepared by a powder application of a plastic such as the ionomer, SURLYN. While not critical, it is desirable that the film cone and cup "feather" in the regions 5 and 11 to provide for a smoother coating. SURLYN is an ethylene methacrylic acid copolymer in which part of the acid has been neutralized with sodium ions.

Plastic materials other than those specifically disclosed in aforementioned U.S. Pat. No. 3,698,586 and other than ionomers can be employed.

Figure 3:
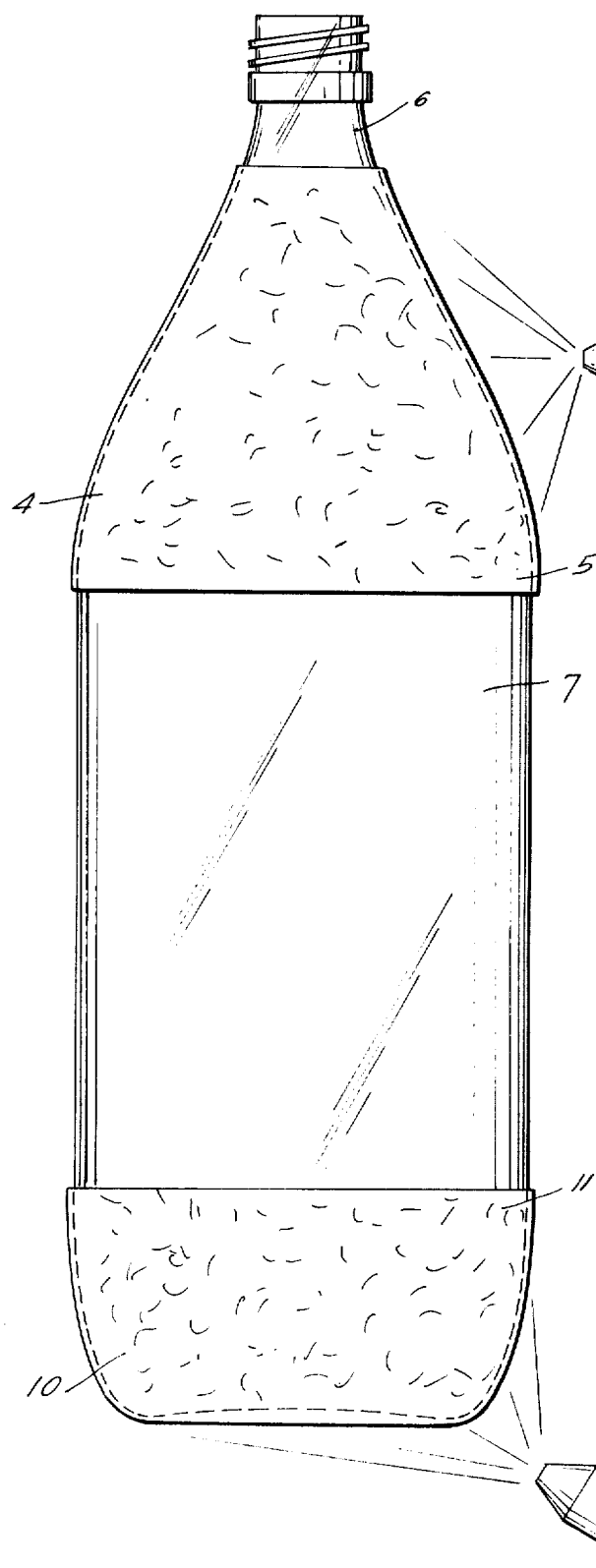
FIG. 3 is a plan view showing application of a cone and cup for protection of the heel and shoulder of the bottle by spray application.

In FIG. 3, application of the cone 4 and cup 10 are shown employing spray nozzles 20 and 21. Such a system can be employed, for example, with the ionomer SURLYN which is a dry powder and is susceptible of application by this method. It will be noted that the upper portion of the bottle 6 is left free of plastic application, as is the central portion 7 of the bottle about which the plastic laminate 2 is to be wrapped. The application of the plastic includes the areas 5 and 11 which are approximately ½ inch onto the straight section of the bottle. Application of the plastic laminate 2 to the bottle is illustrated in FIG. 4. The bottle in FIG. 4 has been provided with a plastic film cone 4 and a plastic film cup 10 prior to application of the plastic layer 2.

While it has been indicated that the upper portion of the bottle 6 is left free of plastic application, as is the central portion of the bottle, except for the one-half inch portions, this is not critical. It is important, only, that some type of cap seal be applicable to the top of the container, without interference from a plastic coating. With regard to the center, while it is preferable that this area be left free of plastic application, except for the approximately one-half inch overlap from the heel and shoulder, this is not critical.

The plastic laminate 2 is applied to the bottle with a layer of adhesive 30. As illustrated in the exploded view of FIG. 5, the plastic laminate 2 includes an inner lamina 31 to which the adhesive 30 is applied and an outer lamina 32. On the side of the lamina 32 which will be joined to lamina 31, a graphic design 33 is printed in reverse. When the two lamina 31 and 32 of plastic laminate 2 have been adhered together, the graphic design 33 will be protected, as it will be between the two lamina, and will appear in its normal situation as it will be viewed through the outer side of lamina 32. Thus, the reverse printing is necessary to provide for proper viewing of the design after the plastic layer 2 has been applied.

If the plastic coating from the heel and shoulder is continued throughout the central section of the bottle 7, then this plastic on the straight section of the bottle may provide the inner lamina 31 of laminate 2. In such case, a graphic design is reverse printed on the inner portion of the outer layer 32 and this is applied directly to the plastic coating on the bottle, again resulting in a laminate which includes the inner plastic coating, the print layer and the outer lamina 32.

The inner lamina 31 of plastic layer 2 is chosen for its tensile strength and tear strength and for reasons of economy, primarily. Among the materials which can be employed in forming this lamina are polyethylene, ionomer films, polyesters, polyvinyl chloride and butadiene copolymers. The thickness of this inner layer should vary from about ¾ to 5 mils, with a preferred thickness of about two to three mils. The ¾ mil lower limit is generally required as it is the thinnest film which can be effectively worked with.

In order to provide a proper background for graphic design 33, the inner lamina 31 is normally treated to render it opaque. The opacity can be provided by a pigment. Preferably, the pigment will be a mineral filler for the plastic which colors the plastic white, such as titania. With polyethylene, the titania is added in small amounts and adds not only opacity to the polyethylene layer, so as to render the graphic design more effective, but also provides improvement in the tensile strength of the polyethylene.

The outer lamina 32 of plastic layer 2 is preferably as thin as possible, not only for reasons of economy, but also to make certain that there is sufficient clarity to view the graphic design through this outer lamina. Materials which can be employed in forming outer lamina 32 include polypropylene, particularly a biaxially oriented polypropylene, nylon, polyethylene terephthalate, ionomer films, butadiene-styrene copolymers, polyvinyl chloride and cellulosics, including cellulosic esters. The thickness of this lamina generally varies from about one-half to three mils.

If the layers are to be applied to returnable bottles, which are subjected to severe washing conditions prior to reuse, the materials of the lamina, and of the adhesives, should be selected with these processing conditions in mind. For such a situation, the lamina can be formed of materials such as nylon, polyethylene terephthalate, and cellulosic materials, particularly cellulose esters.

Though there is generally an adhesive characteristic which causes the layers 31 and 32 to adhere together, and though graphic print 33 aids in this adhesion, it is preferable that each of the layers be treated with an adhesive or with an adhesion promoter to make certain of a unitary structure for plastic laminate 2. For example, the polyethylene lamina 31 can be treated with a high corona discharge which will enhance both the adhesiveness of the lamina and its printability. Further, and frequently in place of the corona discharge treatment, it is desirable that the outer surface of inner lamina 31 be treated with an adhesive such as the type of adhesive which is applied to the reverse side of this lamina, as will be later described. The thickness of this adhesive layer may be somewhat less than one-half mil. Similarly, it is preferred that the outer lamina 32 be treated with a heat sealing plastic adhesive, particularly an ethylene vinyl acetate which may be admixed with plasticizers and other modifying agents as is well known in the art. The heat sealing plastic adhesive is preferably applied to both sides of the outer lamina 32 and the thickness of each coating is generally about 0.2 mil, though the thickness may vary from about 0.1 to 0.4 mil. The heat sealing plastic adhesive is generally applied to the outer lamina prior to application of graphic design 33.

The adhesive layer 30 which is applied to plastic laminate 2 on lamina 31 opposite the graphic print is an important feature of the present invention. This adhesive layer should be generally continuous so as to hold most parts of the label in place and thus will also act to bond almost any fragment of glass which may result from a breakage of the bottle. The thickness of this adhesive layer is generally from about 0.1 to 1 mil and is preferably at least one-half mil. Among the adhesives which can be employed for the adhesive layer 30 are heat sensitive adhesives, pressure sensitive adhesives, and solvent applied adhesive materials. The important characteristics of this adhesive layer are that it bonds to the inner lamina 31, to the glass surface in area 7, and to any plastic film 4 or 10 which may be present in the areas 5 and 11 on the straight portions of the bottle. While not critical, it is also important that there be good adhesion to the material of outer lamina 32 so that there is no flagging in the area of the lap seam which is formed upon complete wrapping of plastic laminate 2. Among the adhesive materials which can be employed for layer 30 are polyvinyl acetate, lacquer adhesives, rubber adhesives, ethylene vinyl acetate mixed with rosins, including the methyl ester of abietol, resins, resin derivatives and resins with plasticizer. Though this layer of adhesive, too, is preferably applied as a lamina to the laminate 2, it can frequently be applied directly to the glass surface and the laminate 2 applied over it.

Figure 6:
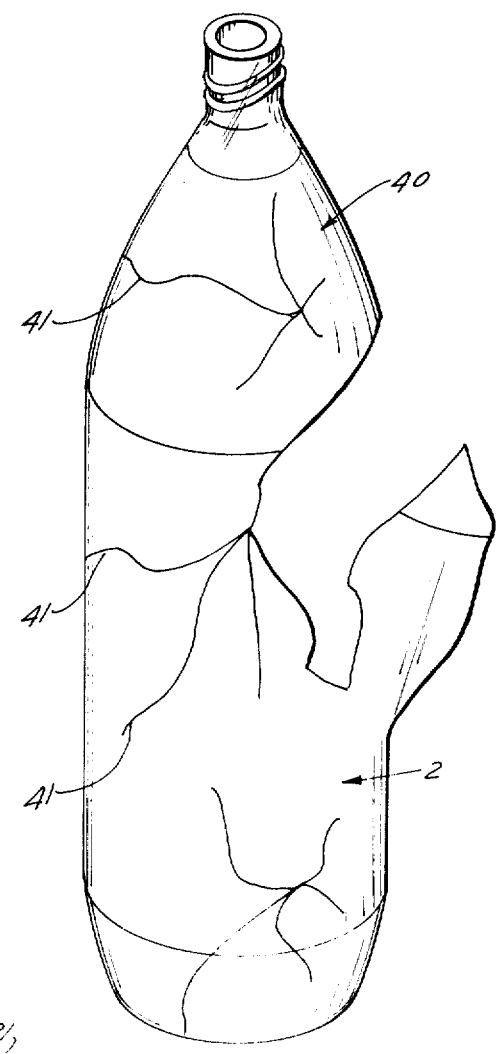
FIG. 6 is a perspective view of a bottle protected according to the present invention after breakage.

The structure of the present invention provides, inter alia, two primary benefits which are encompassed in the same structure. Application of plastic laminate 2 to the central section of the bottle provides, not only, for resistance to scattering of the bottle, should it break, but also allows for an almost limitless range of graphic designs on the surface of the final container. In FIG. 6, 40 illustrates a glass container covered in accordance with the present invention after breakage. It will be noted that there are a plurality of fracture lines 41 which result from breakage of the bottle, but that the plastic laminate 2 holds the fragments of glass together so that they are not spread upon such breakage. Similar advantages are provided by the plastic film cup and cone, when they are present.

Because of the laminated structure 2, almost any graphic pattern can be employed for application to the glass container. Because the graphic design is beneath lamina 32, the graphic design is also protected from abrasion and destruction. Both flexographic and gravure techniques can be employed for printing the graphic design onto the reverse side of lamina 32. While single color designs are possible, it is apparent that with the printing techniques available, multicolor prints of almost any number can be used.

If desired, various coatings may be placed on the glass container prior to application of plastic laminate 2, film cone 4 and/or film cup 10. For example, such coatings can include the abrasion resistant coatings of the prior art such as described in Carl et al, U.S. Pat. No. 3,323,889, and Scholes et al, U.S. Pat. No. 3,420,693.

Thus, a versatile and utilitarian glass container which is protected from abrasion and which resists scattering upon breakage has been shown. Simultaneously, the container can be provided with a graphic design of almost any complexity or number of colors. Obviously, because of the opacity of the inner laminate, the color of the glass in the glass container is not material. This combination of features is provided through adherence of a plastic laminate to a straight section of the glass container. The invention should not be considered as limited to the specific embodiments shown and described, but only as covered by the appended claims.

We claim:

1. In a glass container having a straight section, the improvement which comprises adherence to essentially only the straight section of the container of a unitary plastic laminate, the laminate comprising an inner plastic lamina formed of a material selected from the group consisting of polyethylene, ionomers, polyesters, polyvinyl chloride, butadiene copolymers, nylon, polyethylene terephthalate, and cellulosic materials; and an outer plastic lamina, of equal size to and in alignment with said inner plastic lamina, formed of a material selected from the class consisting of polypropylene, nylon, polyethylene terephthalate, ionomers, butadiene-styrene copolymers, polyvinyl chloride, and cellulosics; with a graphic design between the inner plastic lamina and the outer plastic lamina.

2. The glass container of claim 1 wherein the inner lamina is polyethylene.

3. The glass container of claim 1 wherein the inner lamina is opaque.

4. The glass container of claim 3 wherein the opacity is provided by a colored pigment.

5. The glass container of claim 1 wherein the outer lamina is formed of polypropylene.

6. The glass container of claim 1 wherein adhesives are applied to at least one of the outer layer of the inner lamina, the inner layer of the outer lamina, and the outer layer of the outer lamina.

7. The glass container of claim 1 having an adhesive layer between said straight section and said inner plastic lamina.

8. The glass container of claim 1 wherein the graphic design is reverse printed on the inner surface of the outer plastic lamina.

9. In a glass container having a shoulder portion, with a straight section connected to said shoulder portions, the improvement which comprises:
  a. a plastic film cone on the shoulder portion, said film extending into said straight section; and
  b. a plastic laminate adhered essentially only to said straight section including the portions of the cone film which extend into said straight section, said laminate including:
    1. an inner plastic lamina formed of a material selected from the group consisting of polyethylene, ionomers, polyesters, polyvinyl chloride, butadiene copolymers, nylon, polyethylene terephthalate, and cellulosic materials;
    2. an outer plastic lamina, of equal size to and in alignment with said inner plastic lamina, formed of a material selected from the class consisting of polypropylene, nylon, polyethylene terephthalate, ionomers, butadiene-styrene copolymers, polyvinyl chloride, and cellulosics; and
    3. a graphic design between said inner and said outer lamina.

10. The glass container of claim 9 wherein the inner lamina is polyethylene.

11. The glass container of claim 9 wherein the inner lamina is opaque.

12. The glass container of claim 11 wherein the opacity is provided by a colored pigment.

13. The glass container of claim 9 wherein the outer lamina is formed of polypropylene.

14. The glass container of claim 9 wherein said plastic film cone is preformed.

15. The glass container of claim 9 wherein the plastic film cone is an ionomer and is applied by spray coating.

16. The glass container of claim 9 wherein the portion of the plastic film cone extending into the straight section is feathered.

17. The glass container of claim 9 wherein adhesives are applied to at least one of the outer layer of the inner lamina, the inner layer of the outer lamina, and the outer layer of the outer lamina.

18. The glass container of claim 9 having an adhesive layer between said straight section and said inner plastic lamina.

19. The glass container of claim 9 wherein the graphic design is reverse printed on the inner surface of the outer plastic lamina.

20. In a glass container having a heel portion, with a straight section connected to said heel portion, the improvement which comprises:
  a. a plastic film cup on the heel portion, said film extending into said straight section; and
  b. a plastic laminate adhered essentially only to said straight section including the portions of the cup film which extend into said straight section, said laminate including:
    1. an inner plastic lamina formed of a material selected from the group consisting of polyethylene, ionomers, polyesters, polyvinyl chloride, butadiene copolymers, nylon, polyethylene terephthalate, and cellulosic materials;
    2. an outer plastic lamina, of equal size to and in alignment with said inner plastic lamina, formed of a material selected from the class consisting of polypropylene, nylon, polyethylene terephthalate, ionomers, butadiene-styrene copolymers, polyvinyl chloride, and cellulosics; and
    3. a graphic design between said inner and said outer lamina.

21. The glass container of claim 20 wherein the inner lamina is polyethylene.

22. The glass container of claim 20 wherein the inner lamina is opaque.

23. The glass container of claim 22 wherein the opacity is provided by a colored pigment.

24. The glass container of claim 20 wherein the outer lamina is formed of polypropylene.

25. The glass container of claim 20 wherein said plastic film cup is preformed.

26. The glass container of claim 20 wherein the plastic film cup is an ionomer and is applied by spray coating.

27. The glass container of claim 20 wherein the portion of the plastic film cup extending into the straight section is feathered.

28. The glass container of claim 20 wherein adhesives are applied to at least one of the outer layer of the inner lamina, the inner layer of the outer lamina, and the outer layer of the outer lamina.

29. The glass container of claim 20 having an adhesive layer between said straight section and said inner plastic lamina.

30. The glass container of claim 20 wherein the graphic design is reverse printed on the inner surface of the outer plastic lamina.

* * * * *